United States Patent
Hayakawa

(10) Patent No.: US 7,942,331 B2
(45) Date of Patent: May 17, 2011

(54) SCANNER WITH MODULAR PARTS

(75) Inventor: Hiroshi Hayakawa, Saitamai (JP)

(73) Assignees: Optoelectronics Co., Ltd., Warabi, Saitama (JP); Opticon, Inc., Orangeburg, NY (US)

( * ) Notice: Subject to any disclaimer, the term of this patent is extended or adjusted under 35 U.S.C. 154(b) by 274 days.

(21) Appl. No.: 11/294,646

(22) Filed: Dec. 5, 2005

(65) Prior Publication Data
US 2007/0125864 A1   Jun. 7, 2007

(51) Int. Cl.
*G06K 7/10* (2006.01)
(52) U.S. Cl. ............... 235/462.43; 235/462.39
(58) Field of Classification Search ......... 235/462.4, 235/462.36, 462.43
See application file for complete search history.

(56) References Cited

U.S. PATENT DOCUMENTS

| 5,479,000 | A * | 12/1995 | Dvorkis et al. | 235/472.01 |
| 5,914,481 | A * | 6/1999 | Danielson et al. | 235/462.15 |
| 6,634,556 | B2 * | 10/2003 | Courtney et al. | 235/462.36 |
| 6,729,545 | B2 | 5/2004 | Li et al. | |
| 2001/0017690 | A1 | 8/2001 | Vernackt et al. | |
| 2003/0132918 | A1 | 7/2003 | Fitch et al. | |
| 2003/0141367 | A1 * | 7/2003 | Lucera et al. | 235/462.4 |

FOREIGN PATENT DOCUMENTS
JP   2002-304593 A   10/2002

OTHER PUBLICATIONS

International Search Report and Written Opinion, dated: Dec. 3, 2007, of International Application No. PCT/US2006/061559, filed: Dec. 4, 2006.
International Preliminary Report on Patentability, dated: Jun. 19, 2008, of International Application No. PCT/US2006/061559, filed: Dec. 4, 2006.

* cited by examiner

*Primary Examiner* — Daniel A Hess
*Assistant Examiner* — Rafferty Kelly
(74) *Attorney, Agent, or Firm* — Sorin Royer Cooper, LLC

(57) ABSTRACT

A modular barcode scanner for identifying various types of barcodes or the like is provided. The scanner has a housing that has a light source mounted therein and a plurality of walls with one wall at least partially disposed to allow a light path originating from the light source to pass out of the housing to reach the bar codes. The scanner further has a top module mounted on the top of the housing comprising a flat member having light receiving and processing optics as well as subsequent electronic processing devices mounted thereon; and a bottom module mounted on the bottom of the housing having an inner surface with a rotating mirror mounted thereon for directing the light path.

17 Claims, 2 Drawing Sheets

SCANNER WITH MODULAR PARTS

BACKGROUND OF THE INVENTION

1. Field of the Invention

The present invention generally relates to scanners, more particularly, relates to a scanner with modular sections.

2. Description of the Related Art

Scanners are known. Scanning symbols having data identifying characteristics such as barcodes are also known. The use of discrete components limits further miniaturization of the barcode scanner. Further, improper alignment of the discrete components can render the scanner inoperative. Thus, the discrete components must be carefully aligned during assembly, making the scanner complex and costly to construct and assemble.

U.S. Pat. No. 6,729,545 to Li et al. discloses an integrated scanner for scanning a barcode omnidirectionally with the scanner being formed on a common substrate. The scanner may include a mirror assembly or scan module, a laser diode, and a detector, mounted on a single substrate or several connected substrates. Lenses can be used to focus a laser beam from the laser diode as well as expand a laser beam deflected by the micro-machined mirror. However, in practical applications, for ordinary scanners an easier or more efficient way of forming a scanner is required.

Japanese published patent having Publication Number 2002-304593 to Keyence Corp describes an optical information reader which is miniaturized by reducing wasteful space unnecessary when using the optical information reader and improving the arrangement density of components constituting each part of the optical reader.

Referring to FIG. 1, the Japanese published patent device is shown. The device has a freely insertable and removable frame 27 to be fit and fixed in the casing 28. A device main body 25 obtained by mounting signal processing circuit parts such as a laser beam emitting part 1, a light receiving part 2, and analog and digital signal processing parts 3 and 4 on bendable circuit substrates 21a-21e and bending the substrates, are mounted and fixed to the frame body 27, and housed in the casing 28.

As can be seen, discrete components are used in prior art devices, which need assembling in an elaborate and inefficient manner. Therefore, it is desirable to have a scanner having modular portions free of discrete components and be assemble in a simple and efficient manner. It is further desired to have the scanner with low cost and compact form.

SUMMARY OF THE INVENTION

The present invention generally provides a modular apparatus with modular parts for identifying symbols having data identifying characteristics.

The present invention provides a scanner that is efficiently assembled and adjusted.

The present invention provides a scanner that is of low cost and compact in form.

A modular apparatus for identifying symbols having data identifying characteristics is provided. The apparatus has a housing that has a light source mounted therein and a plurality of walls with one wall at least partially disposed to allow a light path originating from the light source to pass out of the housing to reach the identifying symbols. The scanner further has a top module mounted on the top of the housing comprising a flat member having light receiving and processing optics as well as subsequent electronic processing devices mounted thereon; and a bottom module mounted on the bottom of the housing having an inner surface with a rotating mirror mounted thereon for directing the light path.

A modular barcode scanner for identifying various types of barcodes or the like is provided. The scanner has a housing that has a light source mounted therein and a plurality of walls with one wall at least partially disposed to allow a light path originating from the light source to pass out of the housing to reach the bar codes. The scanner further has a top module mounted on the top of the housing comprising a flat member having light receiving and processing optics as well as subsequent electronic processing devices mounted thereon; and a bottom module mounted on the bottom of the housing having an inner surface with a rotating mirror mounted thereon for directing the light path.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
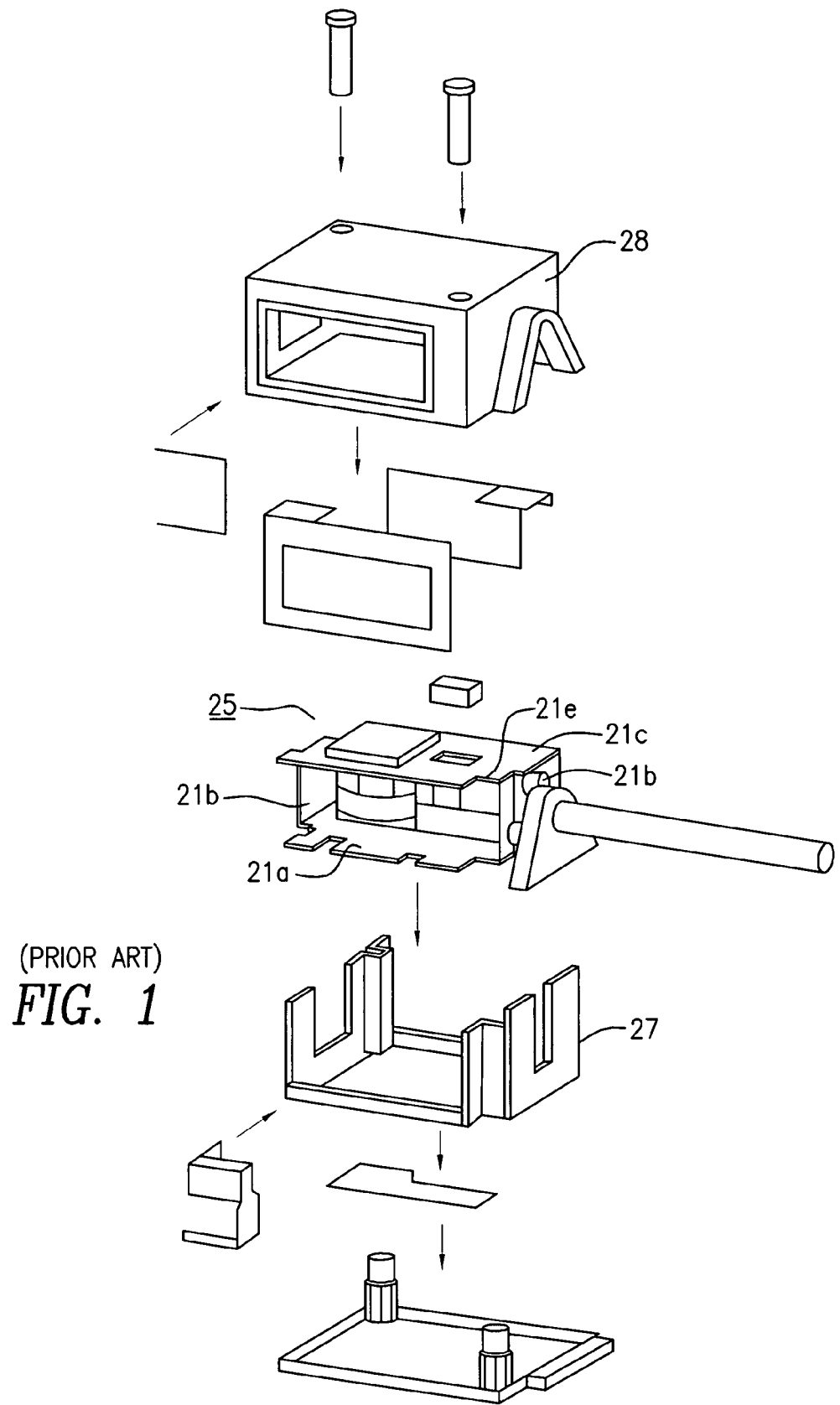
FIG. 1 depicts a prior art scanner.
Figure 2:
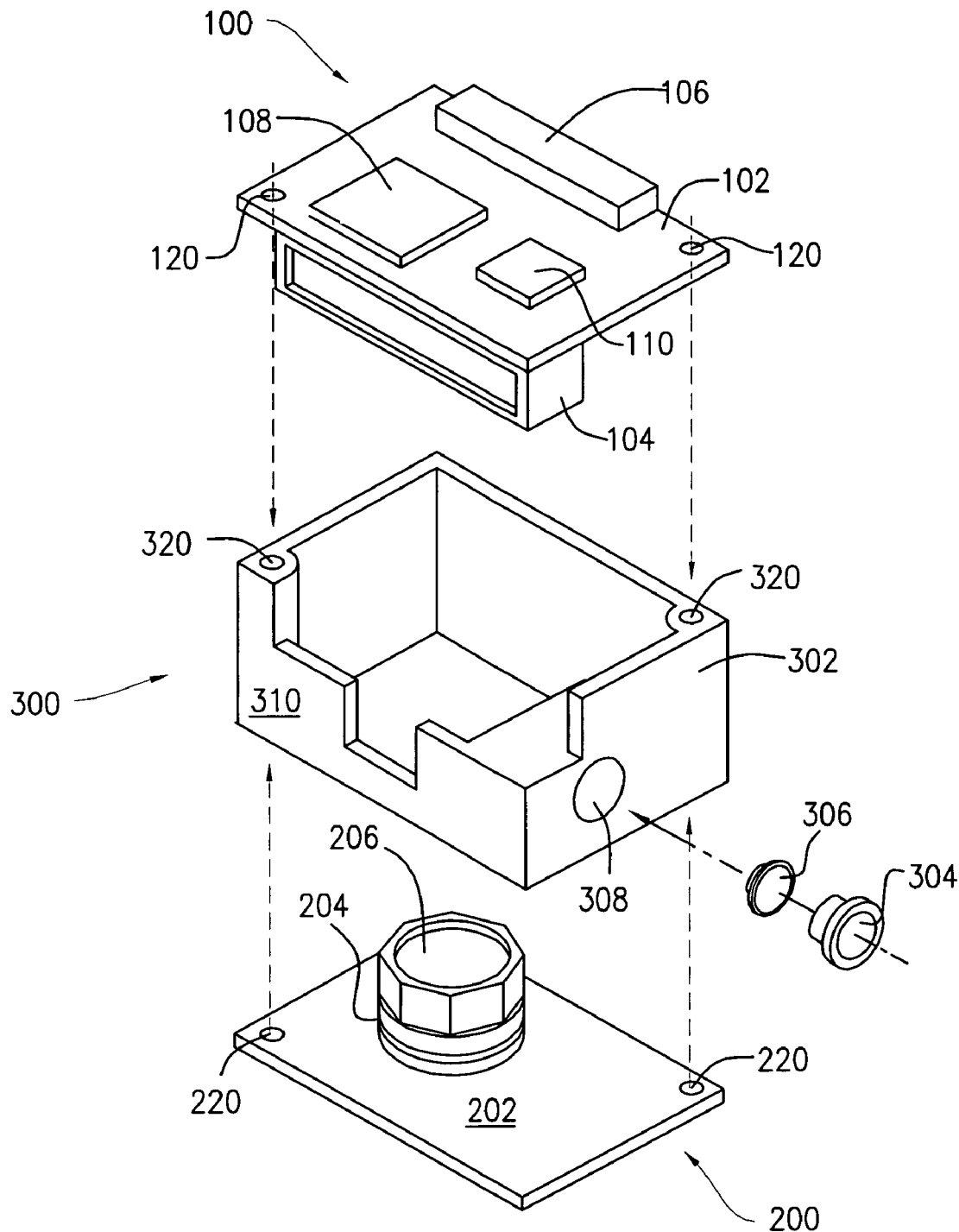
FIG. 2 depicts a compact scanner of the present invention.

The present invention relates to forming a scanner comprised of modules for identifying symbols having data identifying characteristics. The modules include a top module 100 and a bottom module 200, as well as a middle or center module 300. Top module 100 is provided as the mounting platform for light receiving optics 104 receiving light reflected from symbols such as a barcode (not shown) and transforming the reflected light into opto-electronic signal processors for further processing. An interface connector 106 is also mounted one print circuit board 102 for connecting with outside devices. Interface connector 106 may also be used for power supply purposes for coupling to a power source (not shown). A digital ASIC (Application Specific Integrated Circuit) 108 and an analog ASIC 110 may also be mounted on printed circuit board 102. Digital ASIC 108 and analog ASIC 110 both are application-specific integrated circuit chips designed for the scanning application of the present invention.

Bottom module 200 has a bottom substrate having an inner surface 202 adapted to have a unidirectional motor 204 for driving a polygon mirror 206 coupled therewith. Polygon mirror 206 is disposed to rotate in relation to bottom substrate 202.

Center module 300 has a chassis or housing 302 that provide lateral support for both top module 100 and bottom module 200. Center module 300 multiple sided walls for structure support, and also has lateral opening or notch on at least one wall such as wall 310. The notch is adapted to let light within housing 302 to reflect out of the housing 302. Center module 300 further has a cylindrical opening 308 formed on a lateral side thereof for positioning a light source such as a laser diode 304 therein may be positioned therein. Laser diode 304 generates a laser adapted to generate a light path toward polygon mirror 206 and be rotatively reflected by the polygon mirror 206. A focusing lens 306 may be interposed between polygon mirror 206 and the laser diode 304 in the light path.

Top module 100 and bottom module 200 each has openings 120 and 220 respectively disposed to receive a fastener (not shown) for rigidly affixing top module 100 and bottom module 200 onto center module 300. Center module 300 has corresponding receiving holes 320 for receiving the fastener.

The scanner of the present invention generates a light pattern including an omni-directional light pattern for scanning barcodes. Light from the laser diode 304 may first be reflected off of at least one mirror (not shown). The mirror(s) will guide the laser light to the rotating polygon mirror 206. Polygon mirror 206 acts as a diffraction grating, causing the laser light to change its course again. As time elapses, the degree that polygon mirror 206 changes the course of the light increases and then decreases, in a cyclical manner. This continuous course change is what allows the laser light to eventually move across the entirety of a barcode (not shown) without moving the barcode itself. The laser light may reflect off of another series of mirrors (not shown) before striking the barcode subjected to scanning. At this point the light strikes the barcode, and reflects off the same. When the laser reflects off the barcode, the light is dispersed, and not focused as the laser light was. The dispersed light may return along the same path that the laser light traveled, until it reaches light receiving optics 104. Light receiving optics 104 receives the dispersed light, and sends a digital signal to the readout circuitry such as digital ASIC 108 and analog ASIC 110 with the signal strength based on the intensity of the light received. The readout circuitry then processes this signal. After the laser has reflected off each line of the barcode, and the resultant signal processed by the readout circuitry, the barcode is considered to be scanned.

As can be seen, center module 300 is preferably formed out of a single piece with simple geometry. Top module 100 and bottom module 200 have even simpler geometry in that both are structurally formed out of a flat board-like piece or member, i.e., print circuit board 102 and bottom substrate 202. All three modules can be easily manufactured in compact form and at low cost. In addition, center module 300 preferably has no electronic components or circuitry thereon.

In the bottom module 200, except for the motor 204, no other electronic parts are preferably mounted thereon. The controlling of motor 204, which is typically a unidirectional motor, may be easily controlled within bottom module 200 or by a controller mounted on top module 100 in that a controlling path therefore may be easily achieved.

In addition, just simple and easy steps are required to assemble the modules together. In the preferred embodiment, top module 100 and bottom module 200 are simply assembled onto center module 300 by aligning the same using the preformed openings. In other words, the openings 120 on top module 100, the openings 220 on bottom module 200, and the openings 320 on center module 300 are all preformed for simple and easy assembly without elaborate tools or processes.

In an alternative embodiment, center module 300 is not needed because it would be possible to achieve the teachings of the present invention without the box shaped support of module 300. For example supporting pillars member can be place at the four corners connecting module 100 with module 200 for example on their respective four corners. In this alternative embodiment, parts such as focusing lens 306 and laser diode 304 can be suitably mounted either on module 100, or module 200.

While the foregoing is directed to embodiments of the present invention, other and further embodiments of the invention may be devised without departing from the basic scope thereof, and the scope thereof is determined by the claims that follow.

What is claimed is:

1. A modular apparatus for identifying symbols having data identifying characteristics, said apparatus being freestanding on a supporting surface, said apparatus including the following components—a light source producing a light beam, a rotating mirror for scanning said light beam along a remote target containing the symbols, light receiving optics for light reflected from the symbols, and processing electronics for recovering the symbols from the received light, said apparatus comprising:

a first module having a wall which closes on itself to define a hollow enclosure for a three-dimensional interior space, said enclosure extending along an internal axis which is generally parallel to said wall and the interior space being exposed to an exterior thereof at first and second ends of said wall spaced apart along said axis, so that said first and second ends do not lie in a common plane;

a mounting structure for the light source on said wall mounting the source directly to the wall so that its light beam is projected away from the wall and into the interior space;

a window portion of said wall constructed to permit light transmission into and out of the interior space;

a second module generally perpendicular to said axis substantially closing the interior space exposed at one of said first and second ends of said wall so as not to expose the interior space to the exterior, said second module having the light receiving optics mounted thereon so as to extend into the interior space towards the other of said first and second ends at a position to receive, through said window portion light reflected from the symbols; and a third module substantially closing the interior space at the other of said first and second ends of said wall so as not to be exposed to the exterior, said third module having a rotating mirror mounted thereon so as to extend into the interior space towards the one of said first and second ends at a position to have the light beam impinge thereon and to be reflected therefrom out of said window portion.

2. The modular apparatus of claim 1, further comprising at least one fastener means for affixing said second module or said third module onto said first module.

3. The modular apparatus of claim 1, wherein said third module further comprises a motor for driving said rotating mirror.

4. The modular apparatus of claim 1, wherein said rotating mirror is a polygon mirror.

5. The modular apparatus of claim 1, wherein said light beam is a laser beam.

6. The modular apparatus of claim 1, wherein said second module is a circuit board.

7. The apparatus of claim 1 wherein said light receiving optics are mounted on a first surface of said second module, said second module having a second surface opposite said first surface, the processing, electronics being mounted thereon on said second surface, whereby the processing electronics are exterior of the interior space.

8. The apparatus of claim 1 wherein said mounting structure mounts the source so that the projection of said light beam into the interior space is generally lateral to said axis or said window portion is constructed so that light transmission into and out of the interior space is generally lateral to said wall axis.

9. A modular barcode scanner for identifying various types of barcodes or the like, said scanner being free-standing on a supporting surface, said scanner including the following components—a light source producing a light beam, a rotating mirror for scanning said light beam along a remote target containing the symbols, and processing, electronics for recovering the symbols from light received from said target, said scanner comprising:
  a first module having a wall which closes on itself to define a hollow enclosure for an interior volume, said enclosure extending along an internal axis generally parallel to said wall and the interior volume being exposed to an exterior thereof at first and second ends of said wall spaced apart along said axis, so that said first and second ends do not lie in a common plane;
  a mounting structure for the light source on said wall structure mounting the source directly to the wall so that its light beam is projected away from the wall and into the interior volume;
  a window portion of said wall constructed to permit light transmission out of the interior volume;
  a second module generally perpendicular to said axis substantially closing the interior volume at one of said first and second ends of said wall structure so as not to expose the interior volume to the exterior, said second module having a rotating polygon mirror mounted thereon so as to extend into the interior volume towards the other of said first and second ends at a position to have the light beam impinge thereon and to be reflected therefrom out of said window portion; and
  the processing electronics being external of the interior volume.

10. The modular barcode scanner of claim 9, further comprising at least one fastener means for affixing said second module and a third module onto said housing.

11. The modular barcode scanner of claim 10, wherein at least one of said modules has electronic components on both sides thereof, and at least another of said modules does not have electronic components on both sides thereof.

12. The modular barcode scanner of claim 10, wherein said third module comprises a circuit board.

13. The modular barcode scanner of claim 10 wherein said third module comprises substantially all optical and electronic signal processing devices for the modular barcode scanner.

14. The modular barcode scanner of claim 9, wherein said light source is a laser.

15. The scanner of claim 9 wherein said mounting structure mounts the source so that the projection of said light beam into the interior space is generally lateral to said axis or the window portion is constructed so that light transmission into and out of the interior space is generally lateral to said wall axis.

16. A modular apparatus for identifying symbols having data identifying characteristics, said apparatus being free-standing on a supporting surface, said apparatus including the following components—a light source producing a light beam, a rotating mirror for scanning said light beam along a remote target containing the symbols, light receiving optics for light reflected from the symbols, and processing electronics for recovering the symbols from the received light, said apparatus comprising:
  a first module having a wall which closes on itself to define a hollow enclosure for a three-dimensional interior space, said enclosure extending along an internal axis generally parallel to said wall and the interior space being exposed to an exterior thereof at first and second ends of said wall spaced apart along said axis, so that said first and second ends do not lie in a common plane;
  a mounting structure for the light source on said wall mounting the source directly to the wall so that its light beam is projected away from the wall and into the interior space;
  a window portion of said wall constructed to permit light transmission into and out of the interior space;
  a second module generally perpendicular to said axis having a surface substantially closing the interior space exposed at one of said first and second ends of said wall so as not to expose the interior space to the exterior;
  a third module having a surface substantially closing the interior space at the other of said first and second ends of said wall so as not to be exposed to the exterior;
  some of the components being mounted on at least the surfaces of said first and second modules so as to extend into the interior space towards the other of said first and second modules, whereby more efficient use is made of the interior space in housing the components.

17. The apparatus of claim 16 wherein said mounting structure mounts the source so that the projection of said light beam into the interior space is generally lateral to said axis or said window portion is constructed so that light transmission into and out of the interior space is general laterally to said wall axis.

* * * * *